(12) United States Patent
Bart

(10) Patent No.: US 6,539,844 B1
(45) Date of Patent: Apr. 1, 2003

(54) PANCAKE COOKING PAN WITH FLAT COOKING SURFACE

(75) Inventor: Philip D. Bart, Pompano Beach, FL (US)

(73) Assignee: Worldwide Inventions, Inc., Fort Lauderdale, FL (US)

( * ) Notice: Subject to any disclaimer, the term of this patent is extended or adjusted under 35 U.S.C. 154(b) by 0 days.

(21) Appl. No.: 10/063,375

(22) Filed: Apr. 17, 2002

(51) Int. Cl.⁷ .............................. A47J 37/00; A47J 37/07
(52) U.S. Cl. ........................................... 99/424; 99/376
(58) Field of Search .................. 99/422–424, 372–382, 99/339, 340; 219/472, 521–524, 386, 533, 525; 220/4.22, 318, 526, 555, 844, 912; 126/9 R, 41 R

(56) References Cited

U.S. PATENT DOCUMENTS

| | | | |
|---|---|---|---|
| 53,744 A | | 4/1866 | Mull |
| 267,535 A | | 11/1882 | Hurd |
| 740,050 A | | 9/1903 | Shults |
| 924,336 A | * | 6/1909 | French ..................... 99/424 X |
| 933,545 A | * | 9/1909 | French ......................... 99/424 |
| 951,065 A | * | 3/1910 | Ferguson ................. 99/376 X |
| 993,169 A | * | 5/1911 | Hudson ..................... 99/376 X |
| 1,010,887 A | * | 12/1911 | French ...................... 99/424 X |
| 1,072,892 A | * | 9/1913 | Wilson ...................... 99/372 X |
| 1,107,987 A | * | 8/1914 | Nash ......................... 99/424 X |
| 1,292,476 A | * | 6/1919 | Kavanagh ................. 99/426 X |
| 1,855,075 A | * | 4/1932 | Virneburg ................. 99/422 X |
| 1,987,594 A | | 1/1935 | Chiles et al. |
| D119,081 S | | 2/1940 | Weststrang |
| 3,007,595 A | * | 11/1961 | Remley ..................... 220/4.22 |
| 4,011,431 A | * | 3/1977 | Levin ....................... 99/446 X |
| 4,176,593 A | | 12/1979 | Terzian |
| D276,971 S | | 1/1985 | Potts |
| 4,773,318 A | * | 9/1988 | Furletti ..................... 99/424 X |
| 5,299,492 A | | 4/1994 | Carbon |
| 5,642,659 A | | 7/1997 | Sesona |
| 6,035,767 A | * | 3/2000 | Gibson ..................... 99/424 X |

* cited by examiner

Primary Examiner—Timothy F. Simone
(74) Attorney, Agent, or Firm—Malin, Haley & DiMaggio, P.A.

(57) ABSTRACT

A pan for cooking pancakes or omelets that allows for cooking and removal of the finished, cooked food product without the need for a hand-held spatula. The cooking pan includes a first concave cooking container that is joined by a hinge to a flat cooking body having parallel handles that allow the device to be rotated 180 degrees during the cooking process. The final cooked food product can slide by gravity from the flat cooking body without a spatula.

7 Claims, 7 Drawing Sheets

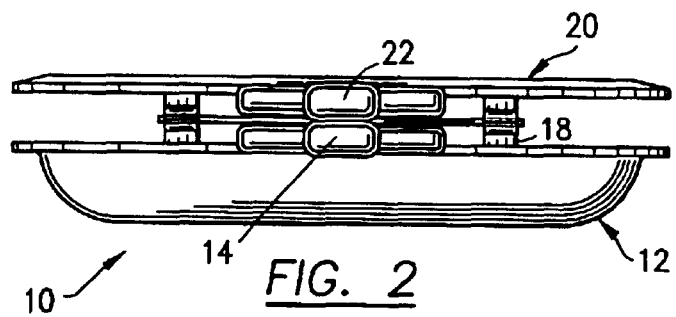
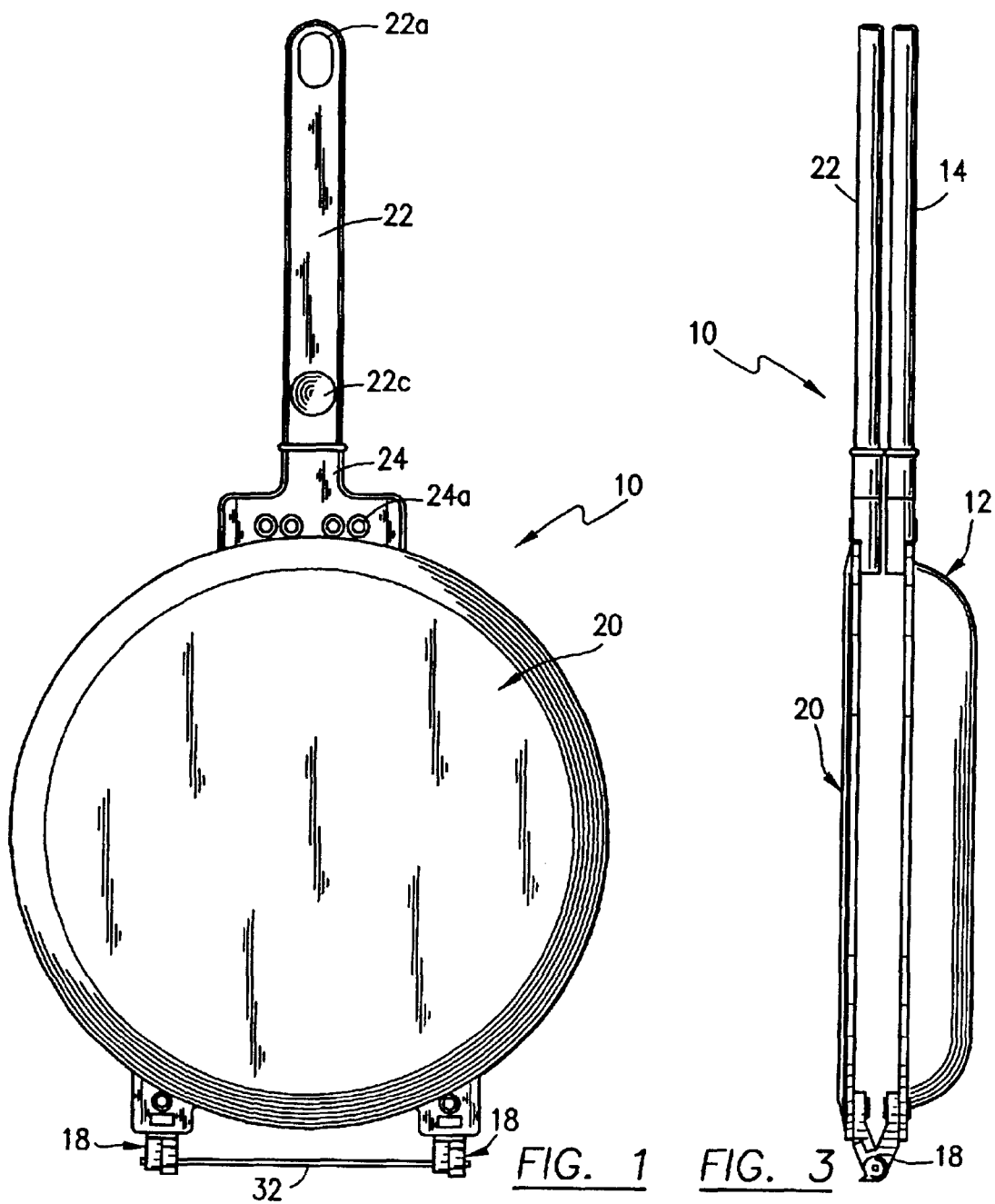

PANCAKE COOKING PAN WITH FLAT COOKING SURFACE

BACKGROUND OF INVENTION

1. Field of the Invention

This invention relates generally to a cooking pan for cooking pancakes and omelets on a conventional stove burner and specifically, to a pancake or omelet pan in which the pan can be rotated 180 degrees during the cooking process such that the resultant food product can be easily served from the pan.

2. Description of the Prior Art

The cooking of liquid food products (such as pancakes and omelets) that start from a liquid batter and subsequently solidify during the cooking process traditionally require that during the cooking process, the cook use a hand-held spatula, that must be inserted carefully between the partially cooked food to turn over the food product so that the food can be cooked on both sides. Cooking pancakes or omelets requires constant monitoring of the pancake or omelet liquid and some agility on the part of the cook in turning over the food with a spatula. The second step required for cooking pancakes or omelets is that once the cooking is complete, the food product must be carefully removed with a spatula from the concave pan. Typically the spatula is manipulated under the food product, and carefully lifted out of the pan for deposit on a plate for serving. Often the food product is much larger than the spatula, providing an opportunity for the food product to break apart during transfer. Because of the concave nature of typical cooking pans, the cook must insert a spatula below the cooked material and carefully remove the material from the pan by moving the food over the concave side of the pan for serving the food. Often the pancake or omelet is broken apart by the act of serving. It is most important to have a high-quality cooking pan in which heat is transferred uniformly throughout the conductive heat surface. The use of iron skillets, aluminum, or copper pans is well known in the cooking of pancakes or omelets. Newer pans often include a non-slip coating on the top surface of the metal pan known under the trademark of Teflon. The pan cooking surfaces are coated to prevent sticking of eggs or pancake batter to the pan. The prior art discloses several different approaches to the uniform cooking of pancakes, griddlecakes or omelets with an attempt to alleviate human intervention with a hand-held spatula to aid in the cooking process. U.S. Pat. No. 740,050 issued to Shults on Sep. 29, 1903 shows a griddle that includes two opposing concave cooking surfaces, hinged together on one side, with a pair of handles issuing from each concave cooking surface. Using this device, the cook lifts the pan, rotates and turns the food and uses the opposing pan to complete the cooking without the use of a hand-held spatula. One of the problems with this device is that both of the cooking surfaces are concave in nature so that one would still require a hand-held spatula to remove and serve the cooked product. U.S. Pat. No. 4,176,593 issued to Terzian issued on Dec. 4, 1979 shows a cooking device that has a self-contained heating unit (not a conventional stove burner) and a pair of concave cooking surfaces that are hinged together in which two pans are partially filled with egg batter or pancake mix and after an initial period, one half of the omelet is turned on to the other half by rotating the pan about a central hinge. Again, both pans are concave and require a spatula for removing the cooked food product. U.S. Design Pat. No. 119,081 issued on Feb. 20, 1940 to Weststrang shows a design patent for a cooking utensil with a pair of handles that include two concave cooking surfaces that are connected together, which apparently can be rotated. Again, both cooking surfaces are concave. U.S. Design Pat. No. 276,971 issued Jan. 1, 1985 to Potts shows a skillet that includes two concave cooking surfaces joined together by a hinge with a pair of handles that are rectangular in shape. U.S. Pat. No. 1,987,594 issued Jan. 15, 1935 to Chiles, et al shows a reversible frying pan that also includes dividers for dividing foodstuff within the pan. Both halves of the cooking surface are concave so that the foodstuff must be removed carefully with a hand-held implement. U.S. Pat. No. 5,642,659 issued Jul. 1, 1997 to Sesona, et al shows a pancake and egg cooker that is self contained that includes a removable cooking concave surface that has a mold that has words embedded for making decorative designs in pancakes or omelets. The entire unit is self-contained and self heated and is not used on a stove. The present invention overcomes the problems of the prior art by providing a cooking pan for cooking pancakes, omelets and other food articles that require turning over during cooking and that begin as a liquid and firm up to be a solid or partial solid when the cooking process has been completed. The present invention provides for two heat-conductive cooking surfaces; one concave and the other flat; hinged together and having separate handles. The initial liquid is poured into the concave cooking surface. Once the cooked material solidifies sufficiently, the entire pan can be flipped 180 degrees. The cooked material now rests on the flat cooking surface until cooking is complete. The cooked food can than easily be removed and transferred to a plate by gravity without having to use a spatula.

SUMMARY OF INVENTION

A cooking pan for cooking pancakes, omelets, or other liquid foods that can be solidified and that require turning over during the cooking process, comprising a concave heat conductive container having a cooking surface that includes a protective non-stick coating on the concave cooking surface portion, a grasping handle connected to one edge of the concave cooking container at a predetermined location, a substantially flat, thin, heat-conductive body having a flat cooking surface attached by a pivotal hinge to the concave cooking container and sized in diameter to be approximately the same size as the concave cooking container and a second handle attached to said flat, heat-conductive cooking body. Both handles are made of a thermal insulating material and when the cooking unit is closed together, the handles are aligned together so that both handles can be grasped in one hand.

The cooking pan can be positioned in two modes, open and closed. The open mode has the concave container resting initially in the lower position, and the flat, disked shaped body hingeably positioned and open at least 90 degrees above the concave container. In this position, the foodstuff in liquid form would be poured into the concave container. The upper flat surface can then be closed relative to the concave container by moving the handles together in a closed position. The closed position 15 with both handles abutting each other and the concave container juxtaposed against the thin, flat body. This is the cooking position.

The concave cooking container is made of a uniform heat conductive material such as aluminum and shaped as a shallow, concave body with a central, circular area portion that is flat for resting on a stove burner. The container shape is circular and is sized to fit on a conventional burner on a stove burner that can be either gas or electric. The diameter of the concave cooking container depends on the size of the food product desired and can be manufactured in different sizes from small to large depending on the cooking environment required, whether at home or commercially. Some stoves have burners that are both large and small in diameter.

The flat cooking body is disk-shaped, flat and has a diameter that is substantially the same as that of the concave cooking container. The hinged joints are such to provide an opening between the concave surface and the flat surface when the two cooking surfaces are closed together. There can be approximately a one to two inch separation between the concave cooking surface base interior portion and the center of the flat cooking surface to see the food article while cooking.

Both pan cooking surfaces (concave and flat) employ a non-stick type of surface material (Teflon) on the outer layer (cooking portion) of the conductive metal such as aluminum, so that cooked food will not stick to either side of the pan.

To operate the invention, the pan is opened and the two cooking surfaces are separated with the two handles. The concave cooking body is placed upon the heating element of the stove. Liquid foodstuff such as pancake batter or an omelet is added to the concave cooking container. The other half of the cooking pan is then rotated so that the handles are together and parallel. The flat cooking body is now on top and directly above the concave cooking container in a closed position. When sufficient cooking of the food has occurred, the cook rotates the cooking pan 180 degrees, grasping both handles together, placing the flat cooking container directly on the burner. The concave cooking container is now on top. Additional cooking may be accomplished but since the foodstuff has solidified during the initial cooking process, no liquid is ejected from the cooking utensil. Once the cooking process is complete, the upper cooking handle is then raised, exposing the cooked food resting on the flat body. The pan can be tilted, allowing the food product to slide off of the flat surface by gravity, eliminating the need for a spatula.

It is an object of this invention to provide an improved cooking pan, especially for liquids such as pancake batter or omelets that eliminates the use of spatulas during cooking and serving.

It is another object of this invention to provide a cooking pan for pancakes or omelets that at the completion of the cooking operation, the cooked foodstuff can slide from the pan without the use of hand-held spatulas.

In accordance with these and other objects which will become apparent hereinafter, the instant invention will now be described with particular reference to the accompanying drawings.

BRIEF DESCRIPTION OF DRAWINGS

FIG. 1 shows a top plan view of the present invention in the closed position.

FIG. 2 shows an end elevational view in the direction of the handle ends in accordance with the present invention FIG. 3 shows a side elevational view of the present invention.

DETAILED DESCRIPTION

Figure 6:
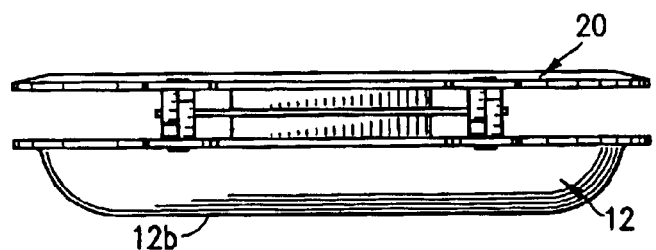
FIG. 6 shows a front elevational view looking at the hinges of the present invention.

Referring now to the drawings and in particular FIG. 1, the present invention is shown generally at 10 as a cooking pan that includes a flat, thin, circular, disk shaped body 20 which is made of a heat conductive metal such as aluminum that includes a handle fastener 24 that is a metal fastener attached to flat body 20 by a plurality of rivets 24a, that also attach a thermally insulative material 22 such as a plastic handle to fastener 24. The handle 22 includes a hemispherically-shaped concave thumb recess 22c for convenience in grasping handle 22 so that the user can put a thumb against and in the concave recess 22c. A pair of hinges 18 is attached on one side to thin body 20. The hinges are joined together by an elongated rigid rod 32. The upper handle 22 includes an opening for aperture 22a for hanging on a hook when the pan is not in use. FIG. 2 and FIG. 3 each show the pan 10 in the closed position and including a lower concave cooking container 12 that is circular and has a handle 14 attached thereto. As shown handles 22 and 14 are parallel and in contact in the closed position as shown in FIG. 2 and FIG. 3. The closed position as shown in FIGS. 2 and 3 is the cooking position.

Figure 4:
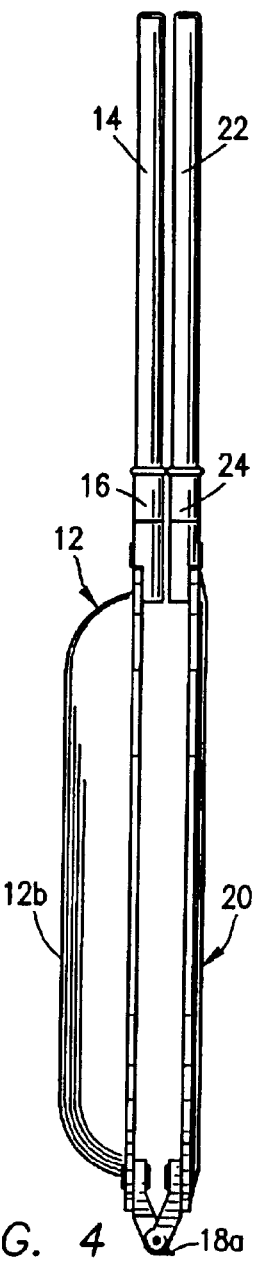
FIG. 4 shows a side elevational view of the present invention 180 degrees from the view shown in FIG. 3.

FIG. 4 is a mirror image of the side elevational view shown in FIG. 3 from the opposite side.

Figure 5:
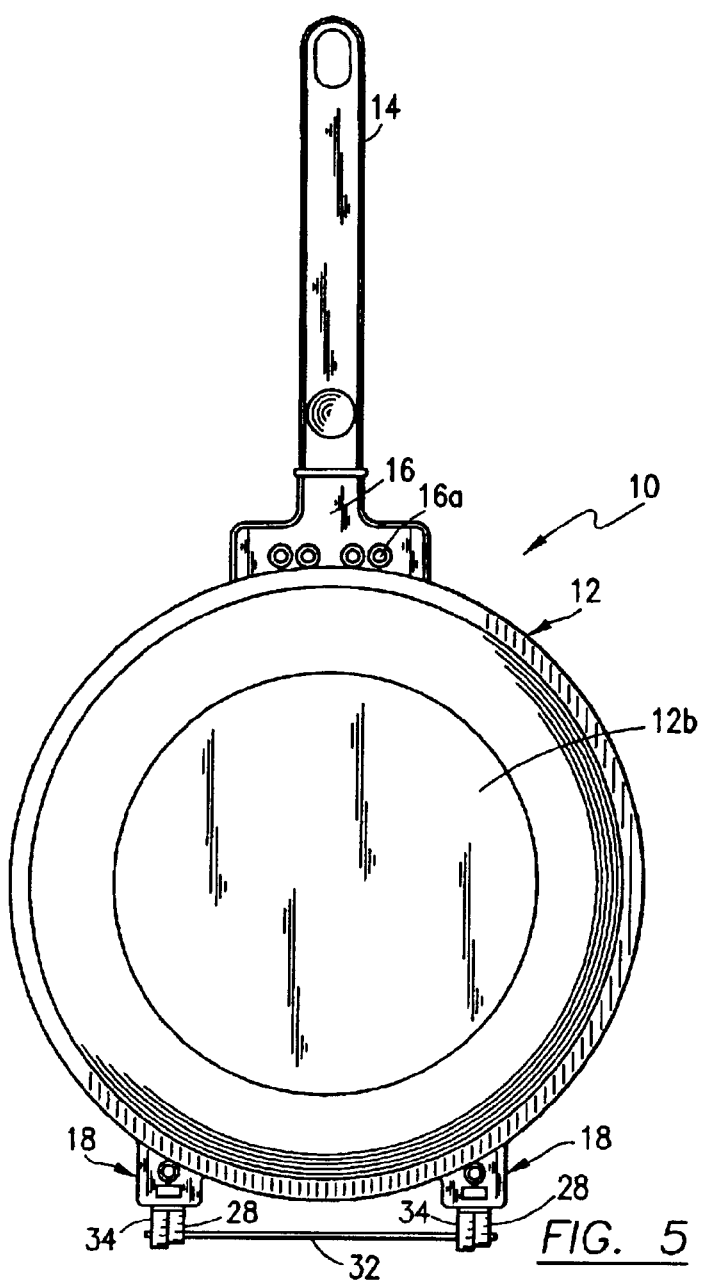
FIG. 5 shows a bottom plan view of the present invention.

FIG. 5 shows a top plan view of the concave cooking container 12 which has a bottom somewhat flat circular area 12b in the center which abuts a stove burner during the cooking process to keep the entire pan level. Handle 14, which is a thermal insulating plastic is attached to container 12 by a metal fastener 16 that attaches handle 14 to container 12 by rivets 16a.

As shown in FIG. 5 hinges 18 include hinge brackets 34 and hinge brackets 28 which are explained in further detail later, joined by bar 32.

Figure 7:
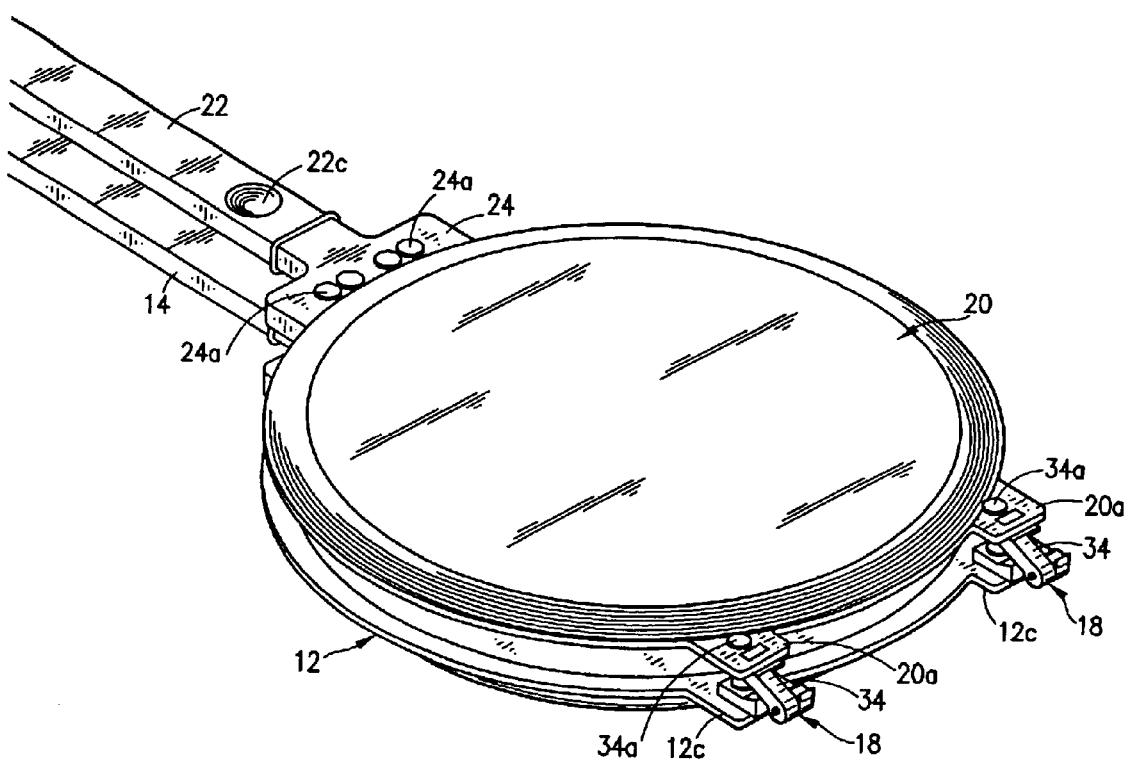
FIG. 7 shows a perspective of the present invention in the closed position.

FIG. 7 shows the device including metal tabs 20a which are integrally formed with flat body 20 that allow hinge bracket 34 to be attached to tab 20a by rivets 34a. The hinges 18 are openly exposed and extend outwardly to allow for easy cleaning and include a hinge stop in the open position described below. Note that the handle 22 is attached to fastener 24 by a plurality of rivets 24a.

Figure 8:
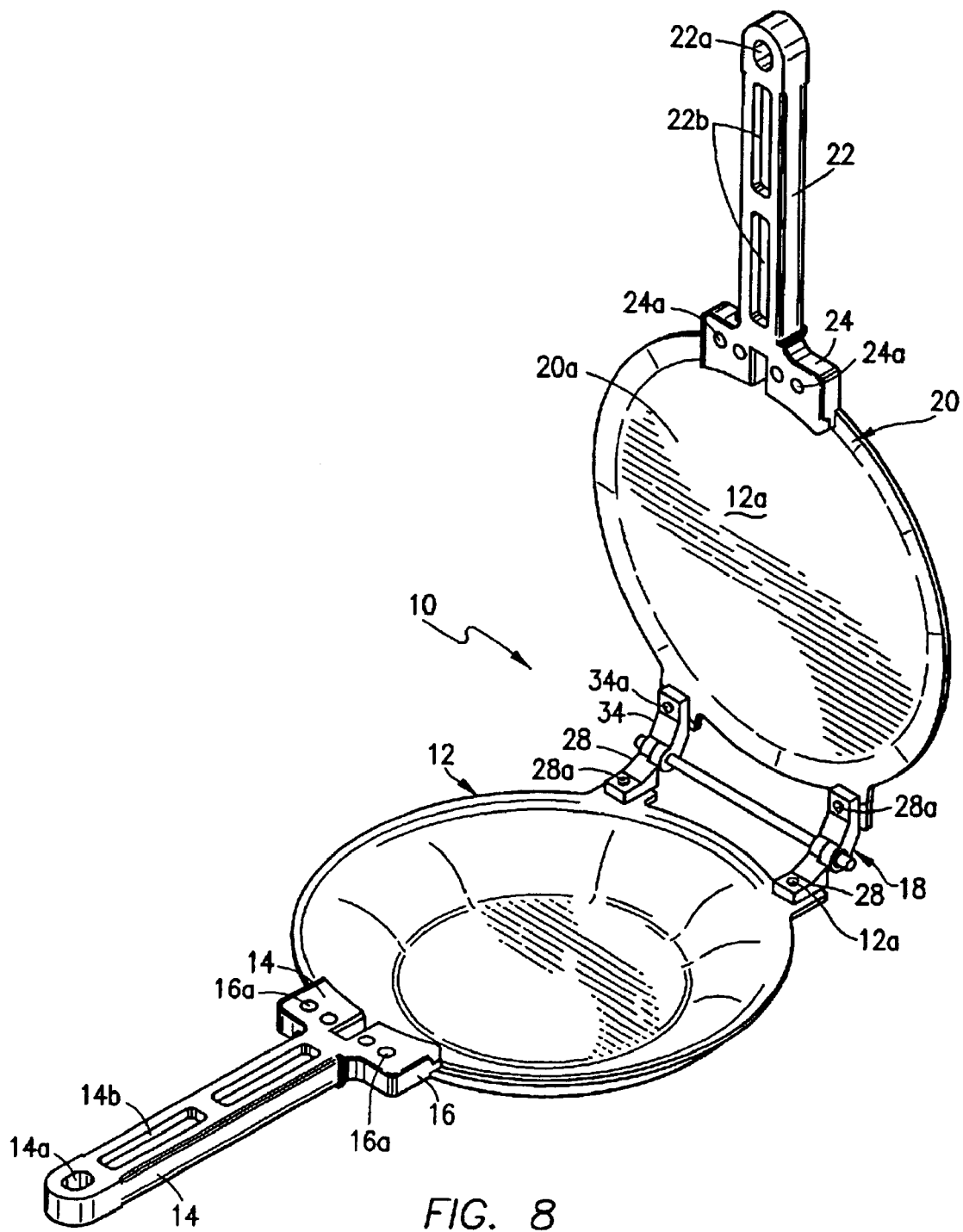
FIG. 8 shows a perspective view of the present invention in an opened position with the concave container on the lower side.

Referring now to FIG. 8, the cooking pan 10 is shown in the open position with the upper flat body 20 moved substantially greater than 90 degrees relative to concave container 112. The concave container 12 includes a non-stick coating 12a that is permanently attached to the metal heat conductive body 12 on the upper surface to prevent foods from becoming stuck within the concave container 12 during cooking.

A similar coating material 20a is permanently attached to the thin body 20 for the same purposes. Such a material in one instance is known under the trade name of Teflon.

FIG. 8 also shows the connection of handle 14 which includes recessed portions 14b in the thermal conductive plastic 14 for strength and weight reduction. The thermal plastic 14 includes being molded into fastener 16 which has a metal wall connected directly to the container 12 through rivets 16a along with handle 14. Hidden beneath fastener 16 metal portion and the plastic 14 of the handle is a tab that forms part of the structure of concave container 12 that allows the handle 14 and the fastener 16 to be attached to concave container 12 by the rivets 16a. A similar construction is accomplished between the flat body 20, handle 22, fastener 24 and rivets 24a.

The hinges 18 include hinge brackets 28 which are affixed to concave pan 12 by rivets 28a.

Flat body 20 is connected to hinge brackets 34 through rivets 34a. The metal bar allows the two rivet brackets 28 and 34 to pivot along the entire upper, flat body 20 and handle 22 can be moved between the opened position that is shown in FIG. 8 and a closed position as is shown in FIG. 7.

As shown in FIG. 8, this would be the initial posture of the pan 10 when the cooking process is commenced. The pancake batter or omelet would be poured into the concave cooking container 12 and the upper flat body 20 moved to a closed position.

Figure 9:
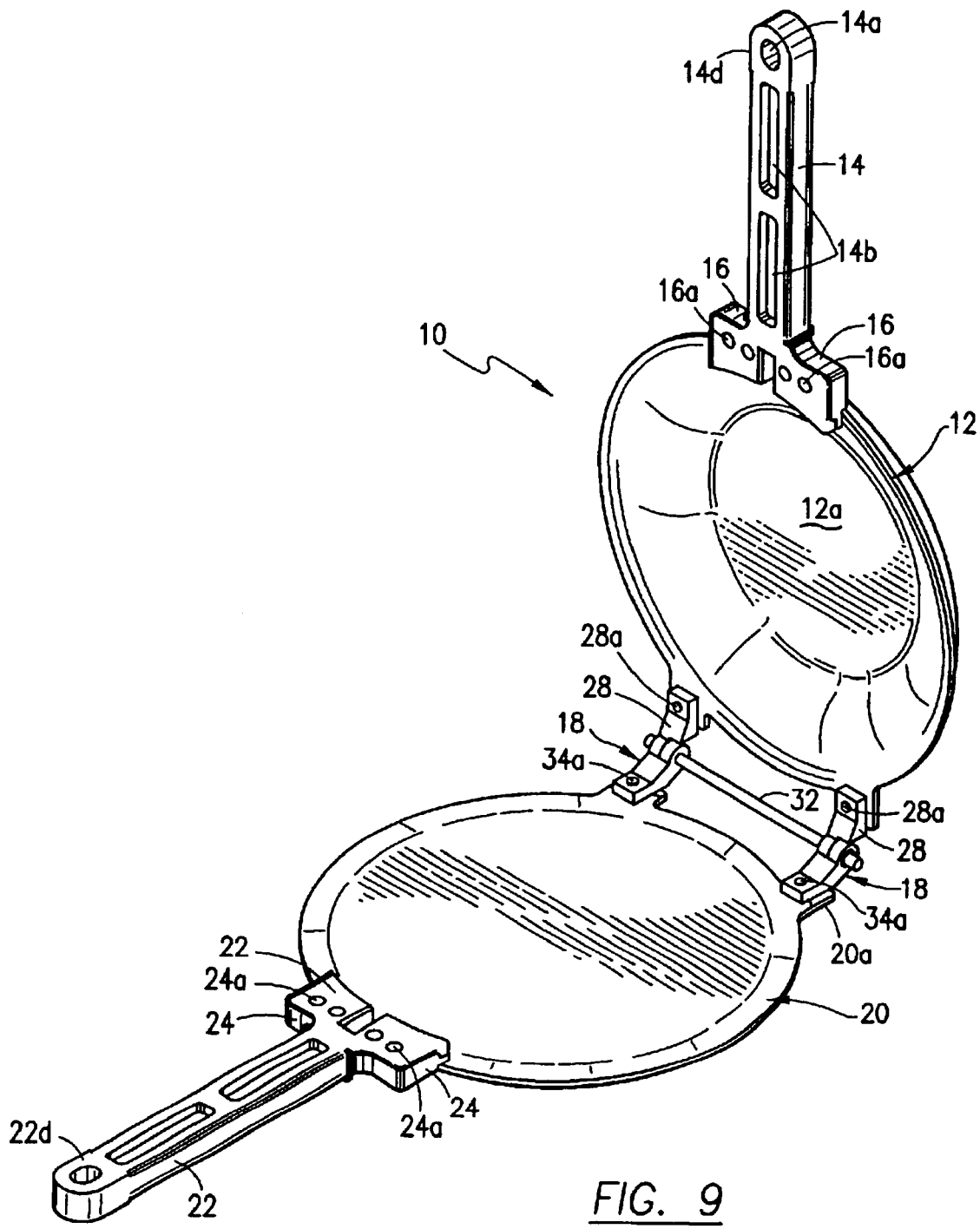
FIG. 9 shows a perspective view of the present invention with the flat body in the lower position such as for serving the cooked food stuff.

During the cooking process, the entire pan is rotated 180 degrees manually turning over the foodstuff to the opposite side. At that point in time, as is shown in FIG. 9, the flat, thin body 20 would be below concave container 12 and flat body 20 would be resting on the burner. The cooking process can then be completed in the closed position. Once the cooking is complete, the upper portion can be raised.

The end tips of handles 14 and 22 include (on the inside portion face) slightly raised end portions 14d and 22d which allow handle separation in the closed position.

One of the important features of the invention, as shown in FIG. 9, is removal and serving of the final cooked food product from the pan. Once can move the entire pan 10 to the serving area and in the position as shown in FIG. 9, merely tilt the lower flat surface 20 over the serving plate and the food stuff will slide off by gravity. There is no concave surface to get in the way of removing the foodstuff. A spatula is not needed to remove the foodstuff from the surface of thin body 20.

Figure 10A:
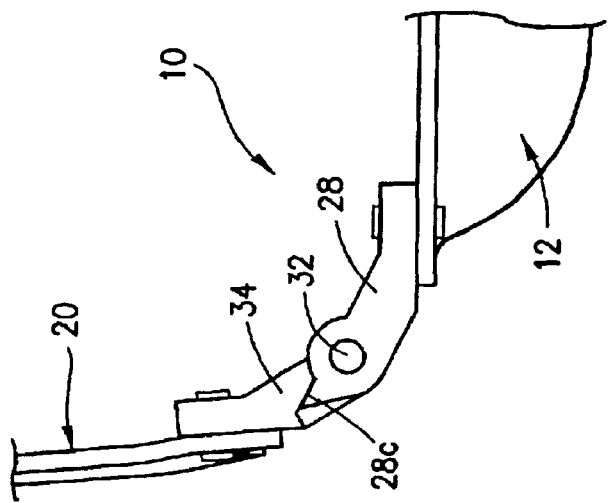
FIG. 10A shows a side elevational view partially cut away of the hinged structure used in the present invention in the closed position.
Figure 10B:
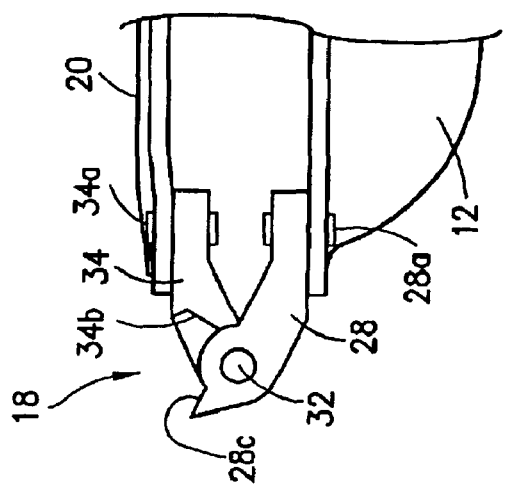
FIG. 10B shows a side elevational view partially cut away of the hinged structure used in the present invention in the opened position.

Referring now to FIGS. 10A and 10B, the hinges 18 are shown such that hinge bracket 28 is connected by rod 32 through hinge bracket 34. Note the flat surface 28c protruding from hinge bracket 28 which is effectively a stop, that engages flat portion 34b when the flat surface 20 is in the open position relative to concave container 12 as shown in FIG. 10B. Rivets 34a and 28a connect the hinge bracket 34 to container 20. Thus, in the open position as shown in FIG. 10B, the upper cooking thin body 20 can rest in an approximately slightly greater than 90 degree position such that the entire pan 10 is stable.

Figure 11:
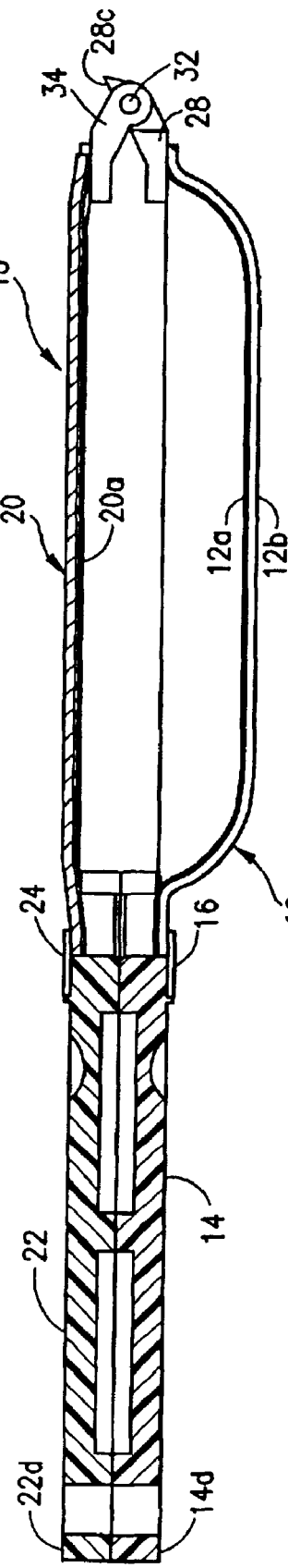
FIG. 11 shows a side elevational view of the present invention in cross section.

FIG. 11 shows the concave nature of the pan 10 such that concave container 12 including coating 12a is suitable for cooking especially initially with the liquid. The lower area 12b is flat to rest on a stove burner uniformly. FIG. 11A shows the closed position.

In operation of the device, referring back to FIG. 8, the cooking pan 10 would be placed on a gas or electric burner of a stove and pancake batter or omelet liquid material poured into the concave cooking container 12. The flat cooking body 20 with handle 22 would then be closed so that the flat body 20 is parallel to the concave container 12 (FIG. 7). There is a sufficient space between the body 20 and the container 12 that allows the cook to observe the food material perimeter for bubbles during cooking. At some stage during the cooking process, when sufficient cooking of the food has occurred, the handles 14 and 22 are grasped and the entire pan is then rotated 180 degrees, with the flat cooking body 20 being placed upon a stove burner (not shown) to complete the cooking process. When the cooking process has been completed, the concave cooking container 12 can be lifted by handle 14 to a position (FIG. 9) so that the completely cooked food product can be easily retrieved from the flat cooking body 20. The food removal can be accomplished by tilting the flat cooking body 20 with the food above a plate, so that the food can then slide off by gravity, since the lower cooking body 20 is flat and has a non-stick surface. This eliminates the need for a hand-held spatula to scoop out the final cooked product.

Figure 12A:
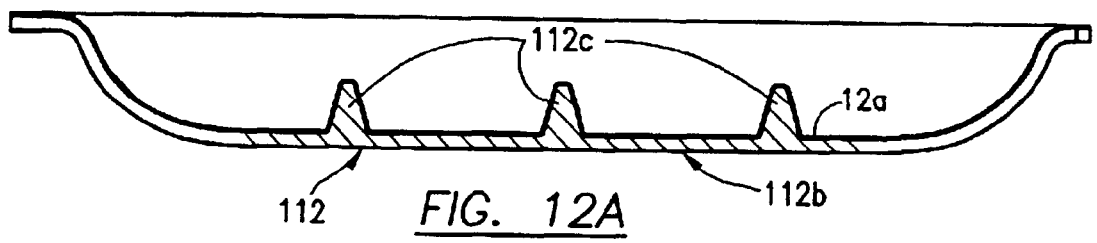
FIG. 12A shows a side elevational view in cross section, partially cut away of the concave cooking pan as an alternate embodiment that includes a plurality of food engaging conical truncated projections to prevent food from moving sideways during the rotation of the pan.
Figure 12B:
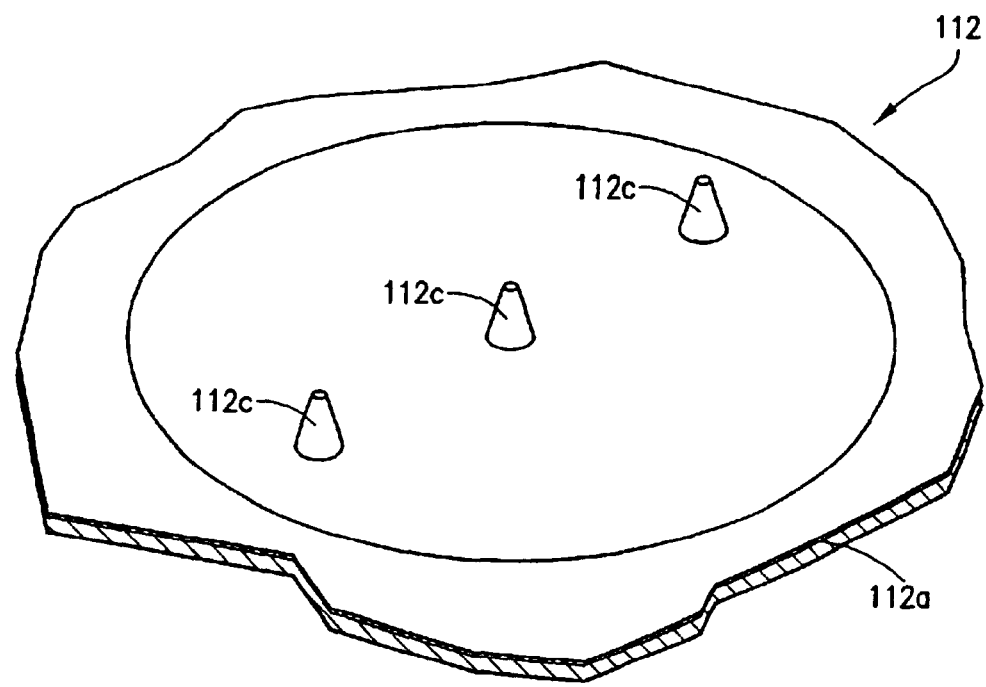
FIG. 12B shows a partially cut away perspective view of the inside cooking surface of the alternate embodiment of the concave cooking pan shown in FIG. 12A.

Referring now to FIGS. 12A and 12B, an alternate embodiment of the present invention is shown. Specifically, the concave cooking pan body 112 includes a Teflon coating 112a on the top inner surface to prevent sticking. The bottom area 112b is substantially flat in the center portion so that the pan can sit stably on a conventional burner. Also included are three truncated, conical projections which may be formed with the original aluminum cooking pan body 112 or that could be spot welded as truncated cones to the upper cooking surface of body 112. The purpose of the truncated conical projections is to become embedded in the cooking food such as a pancake, to prevent lateral movement of the pancake while the pan is being rotated 180 degrees. This prevents any lateral or sideways movement so that the pancake doesn't come out of the pan while the pan is inverted. FIG. 12B shows a plurality of small, truncated cones 112c. The height of each projection 112c could be approximately half the distance from the base of the pan to a plane intersecting the top rim of the pan. However, the projections could be slightly smaller or slightly larger. As shown in FIG. 12B the projections 112c are such that the food stuff will cook around it and that the projections 112c will be embedded in the food while it is cooking, preventing lateral movement. The projections would also include a Teflon coating 112a to prevent sticking. Once the pan is inverted so that the flat cooking surface supports the food stuff, the food connected to the projections 112c will fall by gravity to the lower surface and will no longer engage the projections 112c.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cooking pan for cooking food such as pancakes and omelets that begin in liquid form and then are solidified during the cooking process, comprising;

a concave cooking container made of a heat conductive material that includes a circular body that is concave and has a central flat portion;

a first thermally insulative handle connected to one edge of said concave cooking container;

a flat disk-shaped cooking body;

a second thermally insulative handle connected to one edge of said flat cooking body; and a hinge connecting said concave cooking container to said flat disk-shaped cooking body along one edge, said hinge providing a pre-determined separation between said concave cooking container and said flat cooking body in a closed position for cooking, allowing a certain pre-determined space between the cooking container and the flat cooking body in the closed position to view a portion of the material cooking.

2. A device as in claim 1 wherein said flat cooking body is thermally conductive and includes a cooking surface coating that provides a non-stick cooking surface; and said concave cooking container including a non-stick coating to prevent foods from sticking while cooking.

3. A cooking device as in claim 1, wherein said first handle and second handle are made of thermally insulative materials to reduce heat conductivity and are shaped to fit together in the closed position adjacent each other, said handles being mounted by a pair of tabs firmly attached to the concave cooking surface and the flat cooking surface.

4. A device as in claim 1, wherein:

said hinge includes a position stop to prevent rotation past a predetermined position.

5. A device as in claim 1, including:

first and second handle fasteners connected to said first and second handles and said concave container and said flat cooking body.

6. A device as in claim 1, including:

said concave cooking container including at least one vertical projection connected to the upper cooking surface of said concave cooking container substantial in height so that it will prevent lateral movement of food being cooking within the concave cooking container.

7. A device as in claim 6, including:

said concave cooking container upper surface projection being substantially a truncated, conical member.

\* \* \* \* \*